United States Patent [19]

Michel et al.

[11] Patent Number: 4,613,532
[45] Date of Patent: Sep. 23, 1986

[54] DIMENSIONALLY STABLE SHAPED HOLLOW SECTIONS FROM ALIPHATIC POLYAMIDES AND THEIR APPLICATIONS

[75] Inventors: Klaus Michel; Armin Gude, both of Marl, Fed. Rep. of Germany

[73] Assignee: Chemische Werke Hüls AG, Marl, Fed. Rep. of Germany

[21] Appl. No.: 697,124

[22] Filed: Jan. 31, 1985

Related U.S. Application Data

[62] Division of Ser. No. 464,772, Feb. 7, 1983, Pat. No. 4,519,968.

[30] Foreign Application Priority Data

Feb. 20, 1982 [DE] Fed. Rep. of Germany ....... 3206131
Nov. 25, 1982 [DE] Fed. Rep. of Germany ....... 3243612

[51] Int. Cl.$^4$ ............................................. F16L 11/06
[52] U.S. Cl. ...................................... 428/36; 138/118; 138/177; 138/DIG. 7
[58] Field of Search ................ 264/178 R, 209.4, 568, 264/DIG. 61; 428/36; 138/118, 177, DIG. 7

[56] References Cited

U.S. PATENT DOCUMENTS

| | | | |
|---|---|---|---|
| 2,661,499 | 12/1953 | James, Jr. et al. | 264/209.4 |
| 3,182,108 | 5/1965 | Branscum | 264/178 R |
| 4,303,711 | 12/1981 | Erk et al. | 264/564 X |
| 4,508,769 | 4/1985 | Vander Kool, Jr. et al. | 428/36 |

*Primary Examiner*—Jan Silbaugh
*Attorney, Agent, or Firm*—Wells & Wells

[57] ABSTRACT

Polyamide plastic fuel lines which are dimensionally stable and resistant to fuels, alcoholic fuels and alcohols as fuels are prepared from aliphatic high molecular weight polyamides. The fuel lines are prepared by extruding a hot melt of the polyamide, sizing through a die having a diameter in excess of the given diameter of the fuel line, cooling the fuel line in a cooling bath, removing the fuel line from the bath and sizing the fuel line adiabatically through a disk having a diameter less than the given diameter.

4 Claims, 14 Drawing Figures

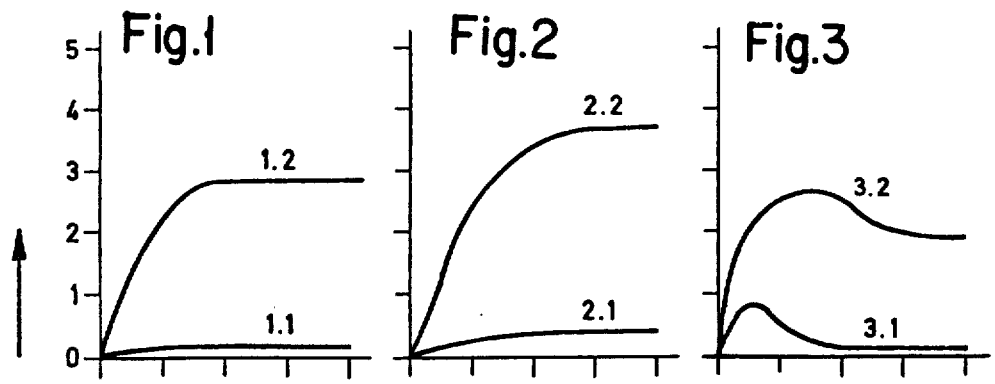
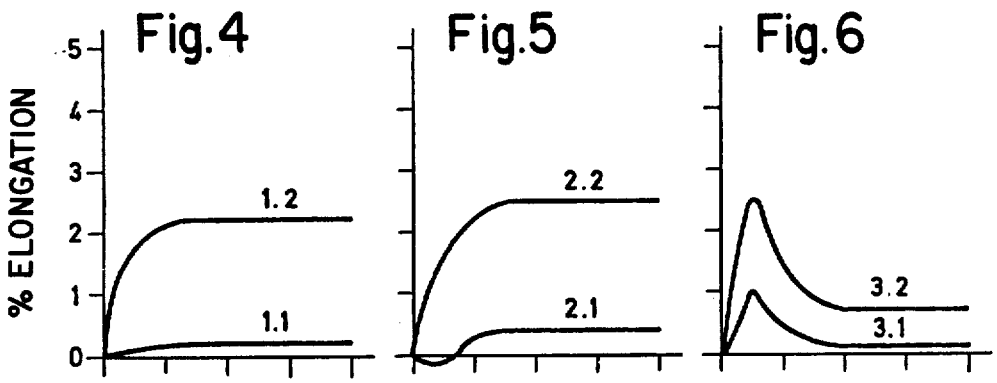
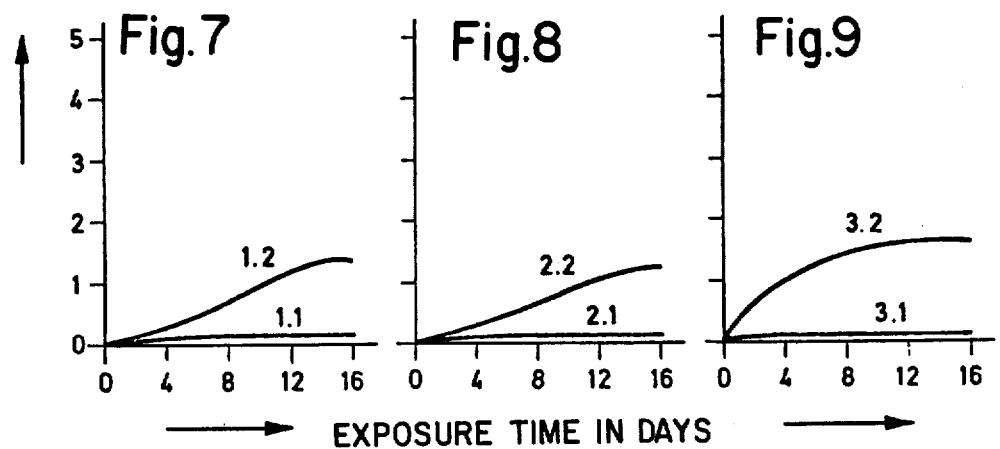

PLOTS
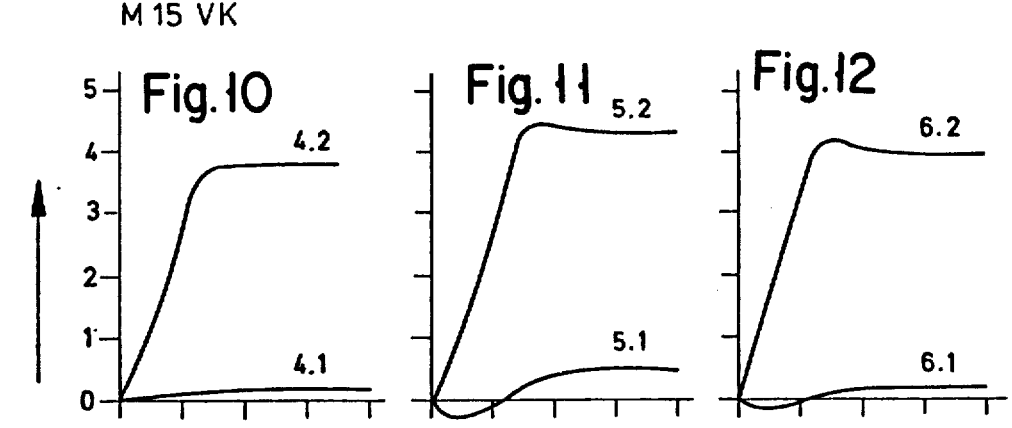
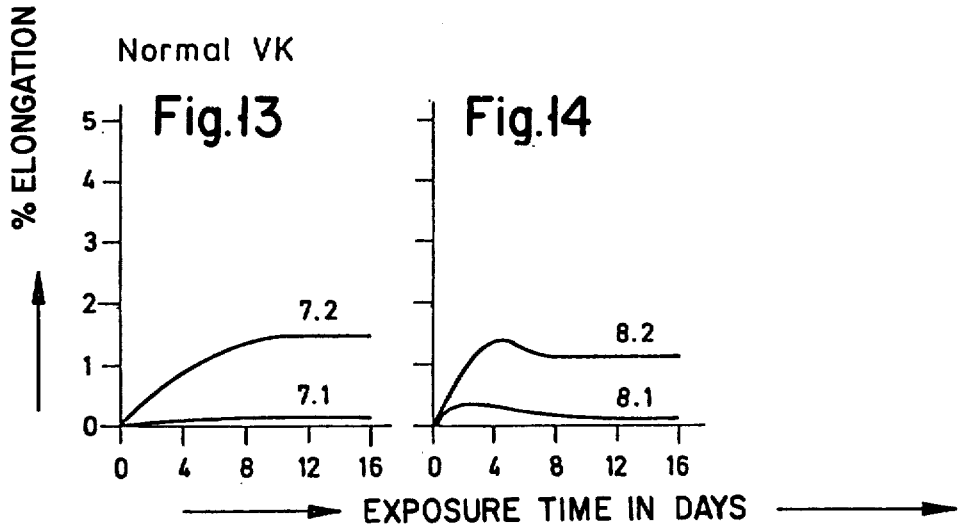

DIMENSIONALLY STABLE SHAPED HOLLOW SECTIONS FROM ALIPHATIC POLYAMIDES AND THEIR APPLICATIONS

CROSS-REFERENCE TO RELATED APPLICATIONS

This is a division of application Ser. No. 464,772, filed Feb. 7, 1983, now U.S. Pat. No. 4,519,968.

Applicants claim priority under 35 USC 119 for applications No. P 32 06 131.5, filed Feb. 20, 1982, and No. P 32 43 612.2, filed Nov. 25, 1982, in West Germany.

BACKGROUND OF THE INVENTION

The field of the invention is shaped, hollow sections, in particular tubes, which are made from polyamides and used as supply lines for the fuels of internal combustion engines.

These polyamides have as the fundamental unit (repeating unit) lactams or omega-amino-carboxylic-acids having at least five carbon atoms per carbon amide group, such as nylon-6, nylon-8, nylon-11, or nylon-12, or polyamides from equivalent quantities of aliphatic dicarboxylic acids and aliphatic diamines which together have at least 12 carbon atoms, for instance nylon-6-6, nylon-6-8, nylon-6-9, nylon-6-10, and nylon-6-12.

It has been found that fuel lines made from these polyamides undergo a longitudinal expansion due to the action from fuels, used for internal combustion engines, in particular with the use of fuels containing alcohols and consisting of alcohols. This longitudinal expansion can be of the order of a few percent. Due to this longitudinal expansion, the lines sag in between the supports, and, accordingly, must be viewed as a source of danger due to rupture and fires resulting therefrom.

The state of the art of extruding tubing and pipe from polyamide plastics may be ascertained by reference to the Kirk-Othmer "Encyclopedia of Chemical Technology," 2nd Edition, Volume 16, (1968), under the section "Polyamide (Plastics)," pages 88-105, particularly pages 89 and 92—nylon-6, nylon-6-6, polylauryl-lactam (nylon-12), polyundecanamide (nylon-11), and additives, and page 99 —pipe and tubing extrusion, the disclosures of which are incorporated herein.

SUMMARY OF THE INVENTION

Having in mind the limitations of the prior art it is an object to produce shaped hollow objects from polyamide plastics which are dimensionally stable to fuels and alcoholic fuels.

It is a particular object of the present invention to provide fuel lines from polyamide plastics which are dimensionally stable with respect to fuels containing alcohols or to alcohols themselves, whereby they incur no disadvantageous elongation.

These objects are achieved by first extruding the polyamide into shaped hollow sections evincing a diameter in excess of a given value, and by subsequently sizing the cooled hollow shaped sections to the given dimension.

The term aliphatic polyamides as used in the present invention having at least 5 carbon atoms per carbon amide group means nylon-6 (polycaprolactam), nylon-8 (polysuberolactam), nylon-11 (polyundecanamide) and especially nylon-12 (polylauryllactam), furthermore polyamides from equivalent quantities of aliphatic dicarboxylic acids and aliphatic diamines which together have at least 12 carbon atoms, for instance nylon-6-6 (of hexamethylenediamine and adipic-acid), nylon-6-8 (of hexamethylenediamine and suberic acid), nylon-6-9 (of hexamethylenediamine and azelaic acid), nylon-6-10 (of hexamethylenediamine and sebacic acid), and nylon-6-12 (of hexamethylene diamine and decanoic-dicarboxylic-acid).

BRIEF DESCRIPTION OF THE DRAWINGS

The new and unexpected results of the present invention are shown in a series of plots of % elongation versus exposure times in days, wherein:

FIG. 1 is a comparison between plot 1.1 of a stabilized nylon 12 according to the present invention, and plot 1.2 of the state of the art both used with M 15 VK carburetor fuel containing 15% methanol;

FIG. 2 is a comparison between plot 2.1 of a stabilized nylon 11 according to the present invention and plot 2.2 of the state of the art both used with M 15 VK carburetor fuel containing 15% methanol;

FIG. 3 is a comparison between plot 3.1 of a stabilized nylon 12 containing 8% plasticizer according to the present invention and plot 3.2 of the state of the art both used with M 15 VK carburetor fuel containing 15% methanol;

FIG. 4 is a comparison as in FIG. 1 except that M 100 VK carburetor fuel containing 100% methanol is used;

FIG. 5 is a comparison as in FIG. 2 except that M 100 VK carburetor fuel containing 100% methanol is used;

FIG. 6 is a comparison as in FIG. 3 except that M 100 VK carburetor fuel containing 100% methanol is used;

FIG. 7 is a comparison as in FIG. 1 except that Super VK commercial fuel according to German Industrial Standard DIN 51,600 is used;

FIG. 8 is a comparison as in FIG. 2 except that Super VK commercial fuel according to German Industrial Standard DIN 51,600 is used; and FIG. 9 is a comparison as in FIG. 3 except that Super VK commercial fuel according to German Industrial Standard DIN 51,600 is used.

FIGS. 10, 11 and 12 are comparisons between the plots 4.1 for nylon-6-12, 5.1 for nylon-6-8 and 6.1 for nylon-6 according to the present invention and the plots 4.2 for nylon-6-12, 5.2 for nylon-6-8 and 6.2 for nylon-6 of the state of art used with M 15 VK carburetor fuel containing 15% methanol.

FIGS. 13 and 14 are comparisons between the plots 7.1 for stabilized nylon-12—for another excess diameter prior to the second calibration—and 8.1 for nylon-12 containing 15% plasticizer according to the present invention and 7.2 for stabilized nylon-12 and 8.1 for nylon 12 containing 15% plasticizer of the state of art in Normal carburetor fuel according to DIN (German Industrial Standard) 51 600.

DESCRIPTION OF THE PREFERRED EMBODIMENTS

To the extent required the polyamide plastics of the present invention contain conventional accessories such as stabilizers, antiageing means, or mixtures thereof. They may also contain other additives such as pigments. Also the present invention contemplates the use of suitable plasticizers such as the derivatives of aromatic sulfonic acid amides or of 4-hydroxybenzoic acid, in particular N-butylbenzenesulfonic acid amide or 4-hydroxybenzoic acid octylester. These derivatives are present in amounts up to 20 percent by weight, especially from 2 to 10% by weight of the total mass of the molding composition. In other words, such a plasticized polyamide substance consists of a polyamide having up to 80% by weight and of a plasticizer up to 20% by weight and in addition to the conventional accessories. Copolyamides having slight amounts of comonomers are not excluded provided they are suitable for the intended application.

The shaped hollow section (tube) is manufactured in conventional manner using an extruder with a tube head, a sizing device, a tank for cooling water and removal means. The polyamide melt issues from the tube die of the tube head at a temperature between 180° and 280° C. is shaped in the sizing device, set for an excess dimension compared to the given diameter being set. Thereupon the shaped hollow section (tube) is cooled in the water tank.

It is known to the state of the art to first extrude hollow nylon sections, heated to be plastically deformable, at about 1.3 times the desired diameter and to insert this tubing heated to be plastically deformable into a gauging device located in a water bath. In this gauging device, the tubing which is heated to be plastically deformable is reduced to the desired lesser diameter and is simultaneously cooled.

The gauging device has a diameter somewhat larger than the desired tubing diameter (Kirk-Othmer, i.b.i.d., page 99). Such hollow nylon sections lack dimensional stability with respect to fuels and they undergo an undesired longitudinal expansion when in contact with such fuels.

According to the present invention, the cooled tubing, having an excess size with respect to the rated diameter, is introduced by means of a take-off device into a second gauging system where it is adjusted to the rated diameter. This takes place without external heat supply (adiabatically).

Advantageously the second gauging is by means of disk gauging, which contrary to the cited state of the art has a somewhat lesser diameter than the rated tubing diameter.

The required excess dimension of the shaped hollow section (tube) prior to the second sizing procedure depends on the processing conditions, on the composition of the polyamide molding substance and to some extent on the medium for which the line is intended, and is adjusted accordingly. The excess size with respect to the given diameter can amount to 5 to 20%, in particular from 10 to 15%.

The temperature of the cooling water and the length of the cooling bath are not critical, however, the temperature should be kept approximately constant. When the cooled shaped hollow section (tube) is made to pass through the second sizing device, the tube will rise slightly in temperature. Thereby, a somewhat elastic reset of the diameter takes place after the gauging procedure. Thereafter the tube can be passed once more through a bath of cooling water for further cooling.

Accordingly, the inside diameter of the second gauging device must be less than the desired rated diameter of the shaped hollow section (tube). As a rule this inside diameter is 2 to 15%, preferably 5 to 10%, less than the rated diameter.

The following specific examples further illustrate the present invention:

EXAMPLES

A tube of the invention (Example 1.1) and a tube of the state of the art (control test 1.2) both made of stabilized nylon-12 are produced using a single-screw extruder with tube head.

The barrel inside diameter of the extruder is 45 mm in both cases; furthermore the ratio of barrel length to inside diameter is 25, and the extruder is provided with triple zone screw having a depth-of-thread ratio of 3:1. The die of the tube head has an outside diameter of 16 mm and an inside diameter of 12 mm. All extruder heaters are set at 240° C. The speed of the feeding screw is 50 rpm.

In Example 1.1 (invention), the melt issuing from the die of the tube head is made to pass into the gauging tube of a vacuum gauging system with an inside diameter of 9.5 mm. The reduced pressure in the vacuum gauging system is 0.36 bars. A tube with an outside diameter of 9.0 mm and a wall thickness of 1 mm is obtained. This tube is cooled in a water cooling bath which is 4 m long. Then this cooled tube is moved through a second gauging device with an inside diameter of 7.5 mm. With adiabatic heating, the rated tube diameter of 8 mm having a 1 mm wall thickness is then obtained. Next, the tube is taken off by means of a take-off system and cut to the proper length.

In the control test 1.2, the melt issuing from the die of the tube head is made to pass into the gauging tube of a vacuum gauging system with an inside diameter of 8.5 mm. The tube is obtained at a reduced pressure of 0.25 bars in the absence of a second gauging procedure with the rated 8 mm outside diameter and 1 mm wall thickness. This tube is cooled in a 4 m long cooling-water bath, taken off with the take-off system and then cut to the proper length.

Examples 2.1 through 8.1 (the invention) and control tests 2.2 through 8.2 are carried out in similar manner. The substances used are a stabilized nylon-11 (2.1 and 2.2), a stabilized nylon-12 containing a plasticizer (3.1 and 3.2), a nylon 6-12 (4.1 and 4.2), nylon 6-8 (5.1 and 5.2), nylon 6 (6.1 and 6.2), stabilized nylon-12 (for another excess size prior to the second calibration) (7.1 and 7.2), and stabilized nylon-12 containing 14% of a plasticizer (8.1 and 8.2).

The test results are shown in the Table I below. D designates the diameter of the gauging tube of the first gauging device, d the diameter of the gauging disk of the second gauging procedure.

The tubes so made are cut to a length of 2,000 mm and filled with carburetor fuels of the following designations:

M 15 VK, M 100 VK, Super VK and Normal VK where VK designates carburetor fuel and M 15 and M 100 designate, respectively, 15 and 100 methanol contents, Super VK and Normal VK are commercial fuels according to German Industrial Standard DIN 51,600.

The fuels filled into the tubes are periodically replenished to achieve test conditions simulating practical conditions.

The changes in length of the tube segments were determined as a function of the time of exposure. The results are plotted in FIGS. 1 through 14.

TABLE 1

| Example | D mm | d mm | tube diameter (mm) per D | per d |
|---|---|---|---|---|
| 1.1 | 9.5 | 7.5 | 9.0 | 8.0 |
| 1.2 | 8.5 | — | 8.0 | — |
| 2.1 | 9.3 | 7.5 | 9.0 | 8.0 |
| 2.2 | 8.5 | — | 8.0 | — |
| 3.1 | 8.8 | 7.6 | 8.5 | 8.0 |
| 3.2 | 8.5 | — | 8.0 | — |

TABLE 1-continued

| Example | D mm | d mm | tube diameter (mm) per D | tube diameter (mm) per d |
|---|---|---|---|---|
| 4.1 | 9.5 | 7.5 | 9.0 | 8.0 |
| 4.2 | 8.5 | — | 8.0 | — |
| 5.1 | 9.0 | 7.5 | 8.5 | 8.0 |
| 5.2 | 8.5 | — | 8.0 | — |
| 6.1 | 9.5 | 7.5 | 9.0 | 8.0 |
| 6.2 | 8.5 | — | 8.0 | — |
| 7.1 | 9.3 | 7.5 | 8.8 | 8.0 |
| 7.2 | 8.5 | — | 8.0 | — |
| 8.1 | 7.0 | 5.6 | 6.7 | 6.0 |
| 8.2 | 6.4 | — | 6.0 | — |

What we claim is:

1. The product obtained by the method for manufacturing shaped, hollow sections of polyamide plastics dimensionally stable under influence of fuels for internal combustion engines and having a given diameter consisting of:
   (a) extruding a hot melt of aliphatic polyamides having at least 5 carbon atoms per carbon amide group or polyamides from an aliphatic dicarboxylic acid and an aliphatic diamine which together have at least 12 carbon atoms through a tube die;
   (b) sizing said hot melt through a first gauging device having an inside diameter greater than said given diameter;
   (c) cooling said shaped, hollow sections obtained in a cooling bath;
   (d) removing the cooled, shaped hollow sections from the cooling bath; and
   (e) sizing the cooled, shaped hollow sections adiabatically through a second gauging device having an inside diameter less than said given diameter whereby said given diameter is achieved.

2. Fuel lines for conducting fuels to internal combustion engines obtained by the method of manufacturing dimensionally stable fuel lines of polyamide plastics having a given diameter consisting of:
   (a) extruding a hot melt of aliphatic polyamides having at least 5 carbon atoms per carbon amide group or polyamides from an aliphatic dicarboxylic acid and an aliphatic diamine which together have at least 12 carbon atoms through a tube die;
   (b) sizing said hot melt through a first gauging device having an inside diameter greater than said given diameter;
   (c) cooling said shaped, hollow sections obtained in a cooling bath;
   (d) removing the cooled, shaped hollow sections from the cooling bath; and
   (e) sizing the cooled, shaped hollow sections adiabatically through a second gauging device having an inside diameter less than said given diameter whereby said given diameter is achieved.

3. Fuel lines for conducting fuels selected from the group consisting of alcoholic fuels and alcohols as fuels to internal combustion engines obtained by the method of manufacturing dimensionally stable fuel lines of polyamide plastics having a given diameter consisting of:
   (a) extruding a hot melt of aliphatic polyamides having at least 5 carbon atoms per carbon amide group or polyamides from an aliphatic dicarboxylic acid and an aliphatic diamine which together have at least 12 carbon atoms through a tube die;
   (b) sizing said hot melt through a first gauging device having an inside diameter greater than said given diameter;
   (c) cooling said shaped, hollow sections obtained in a cooling bath;
   (d) removing the cooled, shaped hollow sections from the cooling bath; and
   (e) sizing the cooled, shaped hollow sections adiabatically through a second gauging device having an inside diameter less than said given diameter whereby said given diameter is achieved.

4. Fuel lines for conducting alcoholic fuels to internal combustion engines obtained by the method of manufacturing dimensionally stable fuel lines of polyamide plastics having a given diameter consisting of:
   (a) extruding a hot melt of aliphatic polyamides having at least 5 carbon atoms per carbon amide group or polyamides from an aliphatic dicarboxylic acid and an aliphatic diamine which together have at least 12 carbon atoms through a tube die;
   (b) sizing said hot melt through a first gauging device having an inside diameter greater than said given diameter;
   (c) cooling said shaped, hollow sections obtained in a cooling bath;
   (d) removing the cooled, shaped hollow sections from the cooling bath; and
   (e) sizing the cooled, shaped hollow sections adiabatically through a second gauging device having an inside diameter less than said given diameter whereby said given diameter is achieved.

* * * * *